United States Patent
Jafari et al.

(10) Patent No.: US 8,585,412 B2
(45) Date of Patent: Nov. 19, 2013

(54) CONFIGURABLE RESPIRATORY MUSCLE PRESSURE GENERATOR

(75) Inventors: Mehdi M. Jafari, Laguna Hills, CA (US); Jeffrey K. Aviano, Escondido, CA (US); Roger S. Mecca, Corona Del Mar, CA (US)

(73) Assignee: Covidien LP, Mansfield, MA (US)

( * ) Notice: Subject to any disclaimer, the term of this patent is extended or adjusted under 35 U.S.C. 154(b) by 958 days.

(21) Appl. No.: 12/241,901

(22) Filed: Sep. 30, 2008

(65) Prior Publication Data

US 2010/0081119 A1 Apr. 1, 2010

(51) Int. Cl.
*G09B 23/28* (2006.01)
(52) U.S. Cl.
USPC .................................. 434/265; 434/262
(58) Field of Classification Search
USPC .................................. 434/262, 267
See application file for complete search history.

(56) References Cited

U.S. PATENT DOCUMENTS

| | | | |
|---|---|---|---|
| 3,808,706 A | 5/1974 | Mosley et al. | |
| 4,001,700 A | 1/1977 | Cook et al. | |
| 4,034,743 A * | 7/1977 | Greenwood et al. | 600/538 |
| 4,167,070 A | 9/1979 | Orden | |
| 4,312,826 A * | 1/1982 | Colvin | 264/221 |
| 4,430,893 A | 2/1984 | Barkalow | |
| 4,440,177 A * | 4/1984 | Anderson et al. | 600/532 |
| 4,464,244 A * | 8/1984 | Uchida et al. | 204/425 |
| 4,491,423 A * | 1/1985 | Cohen | 368/107 |
| 4,752,089 A | 6/1988 | Carter | |
| 4,921,642 A | 5/1990 | LaTorraca | |
| 4,928,684 A * | 5/1990 | Breitenfelder et al. | 128/204.21 |
| 4,954,799 A | 9/1990 | Kumar | |
| 5,003,985 A * | 4/1991 | White et al. | 600/529 |
| 5,057,822 A | 10/1991 | Hoffman | |
| 5,072,737 A | 12/1991 | Goulding | |
| 5,150,291 A | 9/1992 | Cummings et al. | |
| 5,161,525 A | 11/1992 | Kimm et al. | |

(Continued)

FOREIGN PATENT DOCUMENTS

DE 3427182 7/1984

OTHER PUBLICATIONS

Jafari et al. Robust Feedback Design for Proportional Assist Ventilation System Dynamics and Problem Definition. IEEE Conference on Decision and Control Dec. 12-15, 2005; Seville, Spain pp. 4839-4844.*

(Continued)

*Primary Examiner* — Nikolai A Gishnock
(74) *Attorney, Agent, or Firm* — Merchant & Gould P.C.

(57) ABSTRACT

Systems and methods are provided for etiologic-based breath simulation and/or ventilator test platforms that provide operator-configurable breathing patterns, patient respiratory muscular effort waveform characteristics and patient parameter values. According to one embodiment, multiple respiratory muscle effort waveform specifications, each of which have associated therewith one or more waveform parameters, are provided for use by a breathing effort generator. The waveform specifications include (i) a specification based upon an empirical model that approximates clinically-observed, patient-generated muscle pressures, (ii) a specification based on configurable etiology-driven templates and/or (iii) a specification based on a configurable piecewise trajectory template. A waveform engine of the breathing effort generator is configured in accordance with a selected waveform specification and corresponding waveform parameter values. Finally, the desired breathing pattern is simulated by a lung simulation system based on one or more model parameter values and a respiratory muscle effort waveform generated by the waveform engine.

20 Claims, 6 Drawing Sheets

(56) References Cited

U.S. PATENT DOCUMENTS

| | | | |
|---|---|---|---|
| 5,237,987 A | 8/1993 | Anderson et al. |
| 5,271,389 A | 12/1993 | Isaza et al. |
| 5,279,549 A | 1/1994 | Ranford |
| 5,299,568 A | 4/1994 | Forare et al. |
| 5,301,921 A | 4/1994 | Kumar |
| 5,319,540 A | 6/1994 | Isaza et al. |
| 5,325,861 A | 7/1994 | Goulding |
| 5,333,606 A | 8/1994 | Schneider et al. |
| 5,339,807 A | 8/1994 | Carter |
| 5,343,857 A | 9/1994 | Schneider et al. |
| 5,351,522 A | 10/1994 | Lura |
| 5,357,946 A | 10/1994 | Kee et al. |
| 5,368,019 A | 11/1994 | LaTorraca |
| 5,383,449 A | 1/1995 | Forare et al. |
| 5,385,142 A | 1/1995 | Brady et al. |
| 5,390,666 A | 2/1995 | Kimm et al. |
| 5,401,135 A | 3/1995 | Stoen et al. |
| 5,402,796 A | 4/1995 | Packer et al. |
| 5,403,192 A | 4/1995 | Kleinwaks et al. |
| 5,407,174 A | 4/1995 | Kumar |
| 5,413,110 A | 5/1995 | Cummings et al. |
| 5,438,980 A | 8/1995 | Phillips |
| 5,443,075 A | 8/1995 | Holscher |
| 5,513,631 A | 5/1996 | McWilliams |
| 5,517,983 A | 5/1996 | Deighan et al. |
| 5,520,071 A | 5/1996 | Jones |
| 5,524,615 A | 6/1996 | Power |
| 5,531,221 A | 7/1996 | Power |
| 5,542,415 A | 8/1996 | Brady |
| 5,544,674 A | 8/1996 | Kelly |
| 5,549,106 A | 8/1996 | Gruenke et al. |
| 5,584,701 A | 12/1996 | Lampotang et al. |
| 5,596,984 A | 1/1997 | O'Mahony et al. |
| 5,630,411 A | 5/1997 | Holscher |
| 5,632,270 A | 5/1997 | O'Mahony et al. |
| 5,645,048 A | 7/1997 | Brodsky et al. |
| 5,660,171 A | 8/1997 | Kimm et al. |
| 5,664,560 A | 9/1997 | Merrick et al. |
| 5,664,562 A | 9/1997 | Bourdon |
| 5,671,767 A | 9/1997 | Kelly |
| 5,672,041 A | 9/1997 | Ringdahl et al. |
| 5,673,689 A | 10/1997 | Power |
| 5,715,812 A | 2/1998 | Deighan et al. |
| 5,762,480 A | 6/1998 | Adahan |
| 5,771,884 A | 6/1998 | Yarnall et al. |
| 5,791,339 A | 8/1998 | Winter |
| 5,794,986 A | 8/1998 | Gansel et al. |
| 5,812,678 A * | 9/1998 | Scalise et al. ............... 381/67 |
| 5,813,399 A | 9/1998 | Isaza et al. |
| 5,826,575 A | 10/1998 | Lall |
| 5,829,441 A | 11/1998 | Kidd et al. |
| 5,864,938 A | 2/1999 | Gansel et al. |
| 5,865,168 A | 2/1999 | Isaza |
| 5,881,717 A | 3/1999 | Isaza |
| 5,881,723 A | 3/1999 | Wallace et al. |
| 5,884,623 A | 3/1999 | Winter |
| 5,909,731 A | 6/1999 | O'Mahony et al. |
| 5,915,379 A | 6/1999 | Wallace et al. |
| 5,915,380 A | 6/1999 | Wallace et al. |
| 5,915,382 A | 6/1999 | Power |
| 5,918,597 A | 7/1999 | Jones et al. |
| 5,921,238 A | 7/1999 | Bourdon |
| 5,934,274 A | 8/1999 | Merrick et al. |
| 5,975,748 A | 11/1999 | East et al. |
| 6,024,089 A | 2/2000 | Wallace et al. |
| 6,041,780 A | 3/2000 | Richard et al. |
| 6,047,860 A | 4/2000 | Sanders |
| 6,076,523 A | 6/2000 | Jones et al. |
| 6,099,707 A * | 8/2000 | Dunigan et al. ............... 204/406 |
| 6,116,240 A | 9/2000 | Merrick et al. |
| 6,116,464 A | 9/2000 | Sanders |
| 6,123,073 A | 9/2000 | Schlawin et al. |
| 6,135,106 A | 10/2000 | Dirks et al. |
| 6,142,150 A | 11/2000 | O'Mahony et al. |
| 6,161,539 A | 12/2000 | Winter |
| 6,220,245 B1 | 4/2001 | Takabayashi et al. |
| 6,269,812 B1 | 8/2001 | Wallace et al. |
| 6,273,444 B1 | 8/2001 | Power |
| 6,283,119 B1 | 9/2001 | Bourdon |
| 6,305,373 B1 | 10/2001 | Wallace et al. |
| 6,321,748 B1 | 11/2001 | O'Mahoney |
| 6,325,785 B1 | 12/2001 | Babkes et al. |
| 6,357,438 B1 | 3/2002 | Hansen |
| 6,360,745 B1 | 3/2002 | Wallace et al. |
| 6,369,838 B1 | 4/2002 | Wallace et al. |
| 6,411,843 B1 * | 6/2002 | Zarychta ............... 600/546 |
| 6,412,483 B1 | 7/2002 | Jones et al. |
| 6,439,229 B1 | 8/2002 | Du et al. |
| 6,467,478 B1 | 10/2002 | Merrick et al. |
| 6,468,211 B1 * | 10/2002 | Binder ............... 600/301 |
| 6,497,755 B2 * | 12/2002 | Murdoch et al. ............... 96/110 |
| 6,546,930 B1 | 4/2003 | Emerson et al. |
| 6,553,991 B1 | 4/2003 | Isaza |
| 6,557,553 B1 | 5/2003 | Borrello |
| 6,571,795 B2 | 6/2003 | Bourdon |
| 6,622,726 B1 | 9/2003 | Du |
| 6,644,310 B1 | 11/2003 | Delache et al. |
| 6,668,824 B1 | 12/2003 | Isaza et al. |
| 6,669,649 B2 * | 12/2003 | Kahn ............... 600/529 |
| 6,675,801 B2 | 1/2004 | Wallace et al. |
| 6,718,974 B1 | 4/2004 | Moberg |
| 6,725,447 B1 | 4/2004 | Gilman et al. |
| 6,739,337 B2 | 5/2004 | Isaza |
| 6,752,772 B2 * | 6/2004 | Kahn ............... 601/98 |
| 6,761,167 B1 | 7/2004 | Nadjafizadeh et al. |
| 6,761,168 B1 | 7/2004 | Nadjafizadeh et al. |
| 6,814,074 B1 | 11/2004 | Nadjafizadeh et al. |
| 6,866,040 B1 | 3/2005 | Bourdon |
| 6,874,501 B1 | 4/2005 | Estetter et al. |
| 6,910,896 B1 | 6/2005 | Owens et al. |
| 6,921,267 B2 | 7/2005 | van Oostrom et al. |
| 6,960,854 B2 | 11/2005 | Nadjafizadeh et al. |
| 7,036,504 B2 | 5/2006 | Wallace et al. |
| 7,077,131 B2 | 7/2006 | Hansen |
| RE39,225 E | 8/2006 | Isaza et al. |
| 7,117,438 B2 | 10/2006 | Wallace et al. |
| 7,270,126 B2 | 9/2007 | Wallace et al. |
| 7,369,757 B2 | 5/2008 | Farbarik |
| 7,370,650 B2 | 5/2008 | Nadjafizadeh et al. |
| 7,428,902 B2 | 9/2008 | Du et al. |
| 7,460,959 B2 | 12/2008 | Jafari |
| 7,487,773 B2 | 2/2009 | Li |
| 7,654,802 B2 | 2/2010 | Crawford, Jr. et al. |
| 7,694,677 B2 | 4/2010 | Tang |
| 7,717,113 B2 | 5/2010 | Andrieux |
| 7,784,461 B2 | 8/2010 | Figueiredo et al. |
| 7,823,588 B2 | 11/2010 | Hansen |
| 7,855,716 B2 | 12/2010 | McCreary et al. |
| 7,891,354 B2 | 2/2011 | Farbarik |
| 7,893,560 B2 | 2/2011 | Carter |
| 7,959,443 B1 * | 6/2011 | Frembgen et al. ............... 434/265 |
| 7,984,714 B2 | 7/2011 | Hausmann et al. |
| 7,992,557 B2 | 8/2011 | Nadjafizadeh et al. |
| 8,001,967 B2 | 8/2011 | Wallace et al. |
| 8,021,310 B2 | 9/2011 | Sanborn et al. |
| 8,181,648 B2 | 5/2012 | Perine et al. |
| 8,210,173 B2 | 7/2012 | Vandine |
| 8,210,174 B2 | 7/2012 | Farbarik |
| 8,272,379 B2 | 9/2012 | Jafari et al. |
| 8,272,380 B2 | 9/2012 | Jafari et al. |
| 8,302,600 B2 | 11/2012 | Andrieux et al. |
| 8,302,602 B2 | 11/2012 | Andrieux et al. |
| 2003/0229290 A1 * | 12/2003 | George et al. ............... 600/532 |
| 2004/0040560 A1 * | 3/2004 | Euliano et al. ............... 128/204.23 |
| 2004/0139786 A1 | 7/2004 | Henf et al. |
| 2005/0039748 A1 | 2/2005 | Andrieux |
| 2005/0139212 A1 | 6/2005 | Bourdon |
| 2005/0284476 A1 * | 12/2005 | Blanch et al. ............... 128/204.21 |
| 2006/0271407 A1 * | 11/2006 | Rosenfeld et al. ............... 434/262 |
| 2007/0000494 A1 * | 1/2007 | Banner et al. ............... 128/204.23 |
| 2007/0017515 A1 | 1/2007 | Wallace et al. |
| 2007/0077200 A1 | 4/2007 | Baker |
| 2007/0151563 A1 * | 7/2007 | Ozaki et al. ............... 128/204.23 |
| 2007/0227537 A1 | 10/2007 | Bemister et al. |

(56) References Cited

U.S. PATENT DOCUMENTS

| | | | |
|---|---|---|---|
| 2007/0232951 A1* | 10/2007 | Euliano et al. | 600/538 |
| 2007/0259322 A1 | 11/2007 | Yuasa et al. | |
| 2007/0284361 A1 | 12/2007 | Nadjafizadeh et al. | |
| 2008/0053441 A1 | 3/2008 | Gottlib et al. | |
| 2008/0072896 A1 | 3/2008 | Setzer et al. | |
| 2008/0072902 A1 | 3/2008 | Setzer et al. | |
| 2008/0078390 A1 | 4/2008 | Milne et al. | |
| 2008/0083644 A1 | 4/2008 | Janbakhsh et al. | |
| 2008/0092894 A1 | 4/2008 | Nicolazzi et al. | |
| 2008/0097234 A1 | 4/2008 | Nicolazzi et al. | |
| 2009/0052763 A1* | 2/2009 | Acharyya et al. | 382/132 |
| 2009/0203972 A1* | 8/2009 | Heneghan et al. | 600/301 |
| 2010/0011307 A1 | 1/2010 | Desfossez et al. | |
| 2010/0024820 A1 | 2/2010 | Bourdon | |
| 2010/0071689 A1 | 3/2010 | Thiessen | |
| 2010/0071695 A1 | 3/2010 | Thiessen | |
| 2010/0071696 A1 | 3/2010 | Jafari | |
| 2010/0078017 A1 | 4/2010 | Andrieux et al. | |
| 2010/0078026 A1 | 4/2010 | Andrieux et al. | |
| 2010/0081955 A1 | 4/2010 | Wood, Jr. et al. | |

OTHER PUBLICATIONS

J. H. T. Bates and A.-M. Lauzon. A Nonstatistical Approach to Estimating Confidence Intervals About Model Parameters: Application to Respiratory Mechanics. IEEE Transactions on Biomedical Engineering. vol. 39. No. I . Jan. 1992 (Log No. 9104297).*

Active Servo Lung 5000. IngMar Medical. 6 pages.

Adult/Pediatric Lung Model. IngMar Medical. 4 pages.

Hans Rudolph, Inc., www.rudolphkc.com. Series 1101 Breathing Simulator. 2 pages.

Hans Rudolph, Inc., www.rudolphkc.com. Series 1120 Flow/Volume Simulator. 2 pages.

Looking for a great Lung? PneuView. Model 3600i Single Lung. www.michiganinstruments.com. 2 pages.

Looking for a great set of Lungs? PneuView. Model 5600i Dual Adult. www.michiganinstruments.com. 2 pages.

Looking for a great set of Lungs? PneuView. Model 5601i Adult Infant. www.michiganinstruments.com. 2 pages.

Breath Stimulation Module. Michigan Instruments. Downloaded from http://www.michiganinstruments.com/resp-breathsim.htm on Sep. 5, 2008. 2 pages.

IngMar Medical. Neonatal Demonstration Lung Model. 2 pages.

IngMar Medical. QuickLung . . . The Notebook Test Lung. 2 pages.

7200 Series Ventilator, Options, and Accessories: Operator's Manual. Nellcor Puritan Bennett, Part No. 22300 A, Sep. 1990, pp. 1-196.

7200 Ventilatory System: Addendum/Errata. Nellcor Puritan Bennett, Part No. 4-023576-00, Rev. A, Apr. 1998, pp. 1-32.

800 Operator's and Technical Reference Manual. Series Ventilator System, Nellcor Puritan Bennett, Part No. 4-070088-00, Rev. L, Aug. 2010, pp. 1-476.

840 Operator's and Technical Reference Manual. Ventilator System, Nellcor Puritan Bennett, Part No. 4-075609-00, Rev. G, Oct. 2006, pp. 1-424.

* cited by examiner

CONFIGURABLE RESPIRATORY MUSCLE PRESSURE GENERATOR

BACKGROUND

Embodiments of the present invention generally relate to platforms for simulating the action of human breathing and/or testing ventilator performance, and more particularly to systems and methods for significantly enhancing such platforms to support full function etiologic-based breath simulation and to provide fully operator-configurable breathing patterns, patient respiratory muscular effort waveform characteristics and patient parameter values.

Existing ventilator test platforms have limited configurability typically providing only the capability to select one out of a pre-determined set of breathing effort (muscle effort) waveforms for testing a range of intensity of breathing behavior. Similarly, existing mechanisms, such as test lungs, for simulating spontaneously breathing patients to test ventilator performance typically provide a pre-set breathing effort waveform thus limiting the ability of respiratory device manufacturers to comprehensively test their products and the ability of educators to teach appropriate respiratory care for disease-specific etiologic-based respiratory scenarios.

SUMMARY

Systems and methods are described for etiologic-based breath simulation and/or ventilator test platforms that provide operator-configurable breathing patterns, patient respiratory muscular effort waveform characteristics and patient parameter values. According to one embodiment, a method is provided for causing a desired breathing pattern to be simulated by a lung simulation system of a test platform. Multiple respiratory muscle effort waveform specifications are provided for use by a breathing effort generator of the test platform, each of which have associated therewith one or more waveform parameters. The multiple respiratory muscle effort waveform specifications include one or more of (i) a first waveform specification based upon an empirical model that approximates clinically-observed, patient-generated muscle pressures, (ii) a second waveform specification based on configurable etiology-driven templates and (iii) a third waveform specification based on a configurable piecewise trajectory template. A waveform engine of the breathing effort generator is configured in accordance with a selected waveform specification and values for each of the one or more waveform parameters of the selected waveform specification. Finally, the desired breathing pattern is caused to be simulated by the lung simulation system based on (i) one or more model parameter values and (ii) a respiratory muscle effort waveform generated by the waveform engine.

In the aforementioned embodiment, the selected waveform specification may be the second waveform specification and the configurable etiology-driven templates may include generalized, case-specific templates representing breathing behavior incorporating significant characteristics of respiratory diseases reported in literature or knowledge databases.

In various instances of the aforementioned embodiments, the method may further involve prompting an operator of the test platform to provide desired values for each of the one or more waveform parameters utilizing case-specific template menus.

In the context of various of the aforementioned embodiments, the method may further involve receiving information regarding one or more of patient size, ventilatory rate, rhythm, volume, flow, pressure, pattern, shape, compliance, airway resistance and other variables to generate a customized patient profile.

In various instances of the aforementioned embodiments, the method may further involve providing a plurality of pre-programmed pathophysiologic profiles reflecting what a ventilator would encounter in common acute disease states.

In some implementations, the method may further involve providing a plurality of pre-programmed patient profiles representing patients in one or more categories including (i) normal spontaneous tidal ventilation, (ii) ventilatory drive abnormalities, (iii) increased airway resistance, (iv) compliance/elastance problems and (v) neuromuscular abnormalities.

In the context of various of the aforementioned embodiments, the empirical model may include one or more periodic or semi-periodic functions.

In the aforementioned embodiment, the one or more periodic or semi-periodic functions may include a periodic function for an inspiratory phase of respiration that approximates clinically-observed, inspiratory muscle pressures.

In the aforementioned embodiment, the periodic function for the inspiratory phase of respiration may be generally expressed as:

$$P_{mus_i}(t) = -P_{max}\left(1 - \frac{t}{t_v}\right)\sin\left(\frac{\pi t}{t_v}\right)$$

where,
- $P_{max}$ represents a maximum inspiratory pressure, which may be a constant or a time-varying parameter;
- $t_v$ represents duration of inspiration; and
- $t$ represents an elapsed breath time varying between 0 and a total sum of inspiration and expiration periods.

In the aforementioned embodiment, the method may further involve receiving information from an operator of the test platform indicative of the maximum inspiratory pressure, an amplitude multiplier for the inspiratory phase and the duration of inspiration. These multipliers may be used to further fine tune the magnitude and timing of the respiratory effort. For example, amplitude and/or duration multipliers may be determined and used such that the distribution of the corresponding attributes may resemble the random variance in human breathing pattern.

In the context of various of the aforementioned embodiments, the one or more periodic or semi-periodic functions may include a periodic function for an expiratory phase of respiration that approximates clinically-observed, expiratory muscle pressures.

In the aforementioned embodiment, the periodic function for the expiratory phase of respiration may be generally expressed as:

$$P_{mus_e}(t) = P_{max}\left(\frac{t}{t_v}\right)\sin\left(\frac{\pi(t - t_v)}{t_{tot} - t_v}\right)$$

where,
- $P_{max}$ represents a maximum expiratory pressure, which may be a constant or a time-varying parameter;
- $t_v$ represents duration of expiration;
- $t_{tot}$ represents a total sum of inspiration and expiration periods; and
- $t$ represents an elapsed breath time varying between 0 and $t_{tot}$.

In the aforementioned embodiment, the method may further involve receiving information from an operator of the test platform indicative of the maximum expiratory pressure, an amplitude multiplier for the expiratory phase and the duration of expiration. These multipliers may be used to further fine tune the magnitude and timing of the respiratory effort. For example, amplitude and/or duration multipliers may be determined and used such that the distribution of the corresponding attributes may resemble the random variance in human breathing pattern.

In various instances of the aforementioned embodiments, the selected waveform specification may be the third waveform specification and the method may further involve receiving information from an operator of the test platform indicative of desired inspiratory and expiratory effort trajectories.

In the aforementioned embodiment, the information indicative of desired inspiratory and expiratory effort trajectories may be expressed as piecewise effort coordinates for configurable time differentials and the method may further involve smoothing out slope transitions between consecutive intervals defined by the piecewise effort coordinates.

Other embodiments of the present invention provide a breathing effort generator, which includes a storage device and one or more processors. The storage device has stored therein one or more routines for causing a desired breathing pattern to be simulated by a lung simulation system. The one or more processors are operable to execute the one or more routines to generate a respiratory muscle effort waveform in accordance with a selected waveform specification of multiple respiratory muscle effort waveform specifications. The multiple respiratory muscle effort waveform specifications include one or more of (i) a first waveform specification based upon an empirical model that approximates clinically-observed, patient-generated muscle pressures, (ii) a second waveform specification based on configurable etiology-driven templates and (iii) a third waveform specification based on a configurable piecewise trajectory template.

In the aforementioned embodiment, the selected waveform specification may be the second waveform specification and the configurable etiology-driven templates may include generalized, case-specific templates representing breathing behavior incorporating significant characteristics of respiratory diseases reported in literature or knowledge databases.

In the context of various of the aforementioned embodiments, the one or more routines may further prompt an operator of the test platform to provide desired values for one or more waveform parameters utilizing case-specific template menus.

In various instances of the aforementioned embodiments, the selected waveform specification may be the first waveform specification and the empirical model may include a sinusoidal function for an inspiratory phase of respiration that approximates clinically-observed, inspiratory muscle pressures generally expressed as:

$$P_{mus_i}(t) = -P_{\max}\left(1 - \frac{t}{t_v}\right)\sin\left(\frac{\pi t}{t_v}\right)$$

where,
$P_{max}$ represents a maximum inspiratory pressure, which may be a constant or a time-varying parameter;
$t_v$ represents duration of inspiration; and
t represents an elapsed breath time varying between 0 and a total sum of inspiration and expiration periods.

In the aforementioned embodiment, the empirical model may also include a sinusoidal function for an expiratory phase of respiration that approximates clinically-observed, expiratory muscle pressures generally expressed as:

$$P_{mus_e}(t) = P_{\max}\left(\frac{t}{t_v}\right)\sin\left(\frac{\pi(t - t_v)}{t_{tot} - t_v}\right)$$

where,
$P_{max}$ represents a maximum expiratory pressure, which may be a constant or a time-varying parameter;
$t_v$ represents duration of expiration;
$t_{tot}$ represents a total sum of inspiration and expiration periods; and
t represents an elapsed breath time varying between 0 and $t_{tot}$.

In the context of various of the aforementioned embodiment, the selected waveform specification may be the third waveform specification and information is received from an operator of the breathing effort generator indicative of desired inspiratory and expiratory effort trajectories.

In the aforementioned embodiment, the information indicative of desired inspiratory and expiratory effort trajectories includes piecewise effort coordinates for configurable time differentials.

This summary provides only a general outline of some embodiments of the invention. Many other objects, features, advantages and other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals may be used throughout several of the figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

Systems and methods are described for fill function etiologic-based breath simulation and/or ventilator test platforms that provide fully operator-configurable breathing patterns, patient respiratory muscular effort waveform characteristics and patient parameter values. According to one embodiment, segmental design is achieved by allowing a specified breathing experiment episode to be comprised of a number of segments each of which may represent a different breathing behavior (e.g., regular, irregular, apneic) and which may be based upon a different waveform specification using one of the following options: (i) model-based sinusoidal pattern with settable characteristic parameters, (ii) configurable disease-specific etiology-based waveform templates and (iii) segmental inspiratory and expiratory trajectory specification with configurable piecewise waveform parameter settings and smooth spline transitions.

In the following description, for the purposes of explanation, numerous specific details are set forth in order to provide a thorough understanding of embodiments of the present invention. It will be apparent, however, to one skilled in the art that embodiments of the present invention may be practiced without some of these specific details.

Embodiments of the present invention may include various steps, which will be described below. The steps may be performed by hardware components or may be embodied in machine-executable instructions, such as firmware or software, which may be used to cause a general-purpose or special-purpose processor programmed with the instructions to perform the steps. Alternatively, the steps may be performed and/or facilitated by a combination of hardware, software, firmware and/or one or more human operators, such as a clinician.

Embodiments of the present invention may be provided as a computer program product which may include a machine-readable medium having stored thereon instructions which may be used to program a processor associated with a ventilation control system to perform various processing. The machine-readable medium may include, but is not limited to, floppy diskettes, optical disks, compact disc read-only memories (CD-ROMs), and magneto-optical disks, ROMs, random access memories (RAMs), erasable programmable read-only memories (EPROMs), electrically erasable programmable read-only memories (EEPROMs), magnetic or optical cards, flash memory, MultiMedia Cards (MMCs), secure digital (SD) cards, such as miniSD and microSD cards, or other type of media/machine-readable medium suitable for storing electronic instructions. Moreover, embodiments of the present invention may also be downloaded as a computer program product. The computer program may be transferred from a remote computer to a requesting computer by way of data signals embodied in a carrier wave or other propagation medium via a communication link (e.g., a modem or network connection). For example, various subsets of the functionality described herein may be provided within a legacy or upgradable test platform as a result of installation of a software option or performance of a firmware upgrade.

As used herein, the terms "connected" or "coupled" and related terms are used in an operational sense and are not necessarily limited to a direct physical connection or coupling. Thus, for example, two devices of functional units may be coupled directly, or via one or more intermediary media or devices. As another example, devices or functional units may be coupled in such a way that information can be passed there between, while not sharing any physical connection one with another. Based on the disclosure provided herein, one of ordinary skill in the art will appreciate a variety of ways in which connection or coupling exists in accordance with the aforementioned definition.

As used herein, the phrases "in one embodiment," "according to one embodiment," and the like generally mean the particular feature, structure, or characteristic following the phrase is included in at least one embodiment of the present invention, and may be included in more than one embodiment of the present invention. Importantly, such phases do not necessarily refer to the same embodiment. If the specification states a component or feature "may", "can", "could", or "might" be included or have a characteristic, that particular component or feature is not required to be included or have the characteristic.

Figure 1:
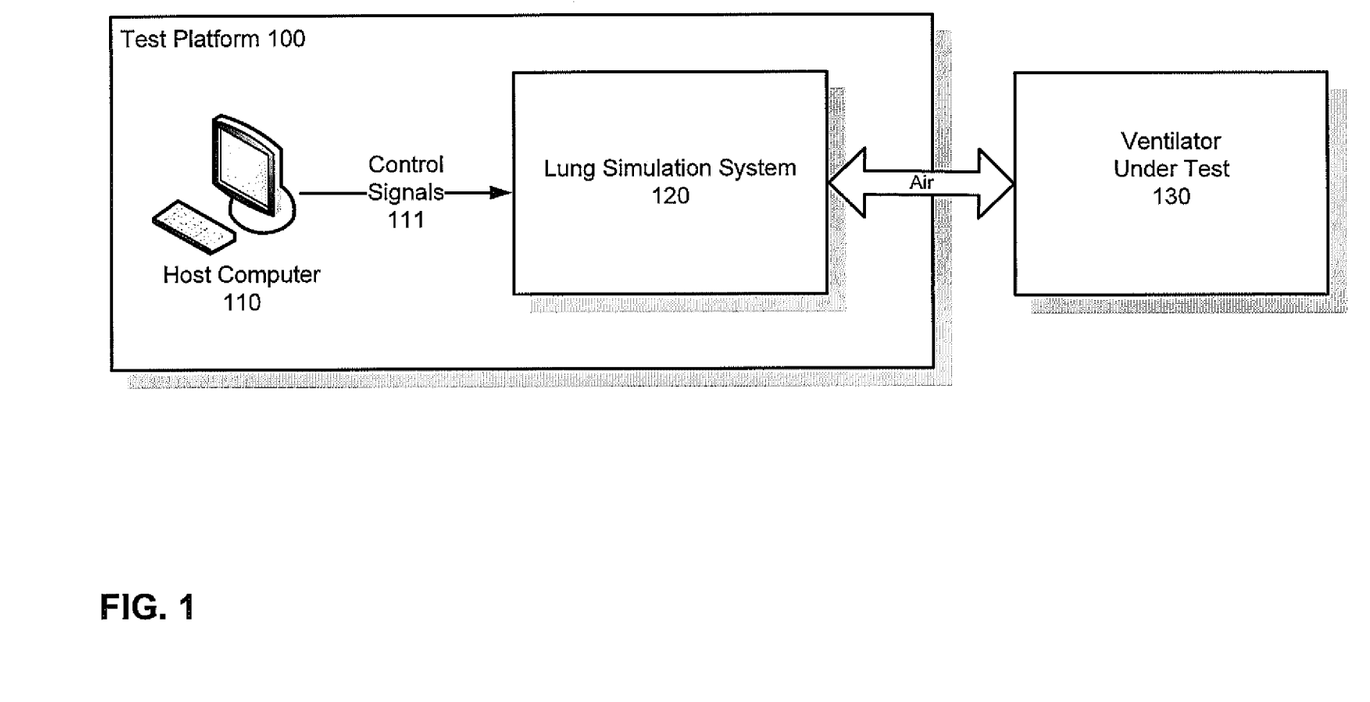
FIG. 1 depicts a simplified block diagram illustrating interactions between a host computer and a lung simulation system of a test platform and interactions between the test platform and a ventilator under test in accordance with an embodiment of the present invention. The gas delivered by the ventilator to the Lung Simulation System may be air, oxygen, or any other type of gas or gas mixtures used in medical ventilators.

FIG. 1 depicts a simplified block diagram illustrating interactions between a host computer 110 and a lung simulation system 120 of a test platform 100 and interactions between the test platform 100 and a ventilator under test 130 in accordance with an embodiment of the present invention. According to the present example, the host computer 110 outputs control signals 111 which direct the lung simulation system 120 to operate in a manner consistent with desired research, development, demonstration and/or training (e.g., respiratory care instruction/teaching) goals. For example, the lung simulation system 120 may be configured by control signals 111 to operate in such a manner as to cycle the ventilator under test 130 through production test sequences, for example, or to allow development of adaptive algorithms on the ventilator under test 130. The test platform 100 may also be used to evaluate new or improved respiratory modes or to evaluate performance characteristics and/or ventilator/patient interaction. Various other usage models are contemplated for test platform, including, but not limited to, acquiring comparative testing data.

Lung simulation system 120 may be existing or future physical lung simulators, including, but not limited to, bellows based, pneumatically powered or servo motor driven piston pump based test lungs. The lung simulation system 120 may be specific to a particular patient type, e.g., adults, pediatrics and neonates, or one instrument may be sufficient to simulate the entire range of patients.

Host computer 110 may be any processor-based device with sufficient memory and processing capabilities to perform the calculations and/or modeling described herein. For example, host computer 110 may be a commercially available laptop computer, desktop computer or even a handheld device, such as a pocket computer, personal digital assistant, or the like.

Control signals 111 may be in any suitable form accepted by the lung simulation system 120 and sufficient to appropriately direct the lung simulation system 120. For example, the control signals 111 may include one or more lung parameters or parameters of the equation of motion, information upon which such parameters may be derived, a pressure waveform, a flow waveform, a respiratory muscle effort waveform, information upon which one or more of the aforementioned waveforms may be derived and the like.

The interface (not shown) between the host computer 110 and the lung simulation system 120 may be of any appropriate type suitable for the circumstances. Examples of physical interfaces include, but are not limited to, a serial port (e.g., an IEEE 1394 interface, a Universal Serial Bus (USB) interface), a parallel port, an Ethernet port and the like. In some implementations, the interface may be a wireless protocol using short and/or long-range communications technology, including but not limited to various IEEE 802.11 technologies, Bluetooth™, 3G wireless networks, cellular network technologies, such as Global System for Mobile (GSM) communications and Short Message Service (SMS)), infrared and the like. Alternatively, the control signals 111 may be temporarily stored in a memory data storage device, such as a flash drive or the like, prior to being delivered to the lung simulation system 120.

Figure 2:
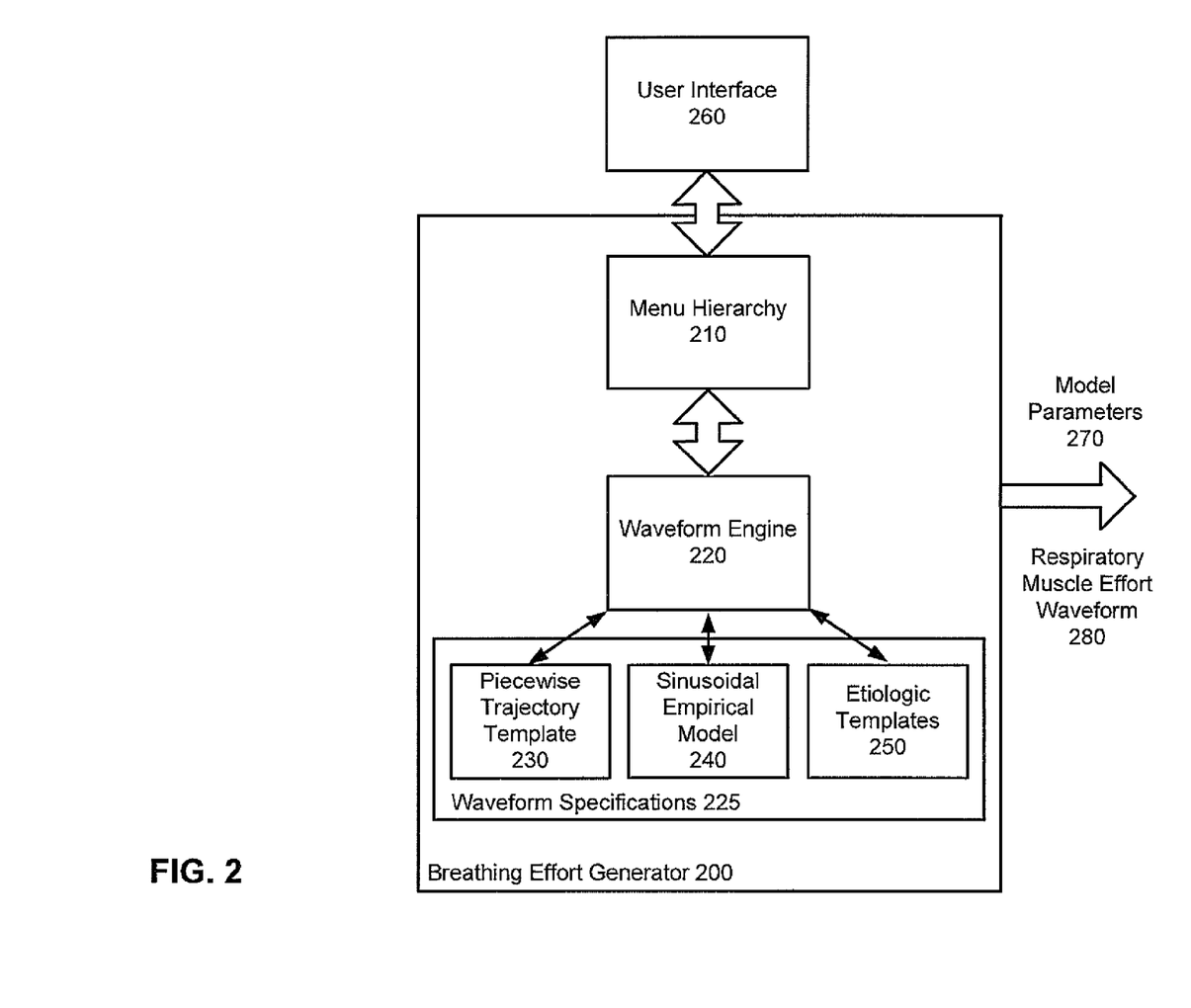
FIG. 2 is a simplified block diagram conceptually illustrating interactions among various functional units of a breathing effort generator in accordance with an embodiment of the present invention.

FIG. 2 is a simplified block diagram conceptually illustrating interactions among various functional units of a breathing effort generator 200 in accordance with an embodiment of the present invention. In one embodiment, breathing effort generator 200 is a fully configurable, full-phase (inspiratory and expiratory) breathing effort generator that provides the capability of specifying and generating innumerable breathing patterns, waveform characteristics and parameter values.

According to the present example, breathing effort generator 200 outputs model parameters 270 and a respiratory muscle effort waveform 280 to lung simulation system 120, for example, and interfaces with a user interface 260. In some embodiments of the present invention, user interface 260 is a graphical interface or a touch screen interface that is capable of receiving operator commands, and is capable of providing feedback to the operator or prompting the operator for further information regarding breathing experiments based on information provided from breathing effort generator 200. It should be noted that the aforementioned graphical interface and touch screen user interface are merely exemplary, and that one of ordinary skill in the art will recognize a variety of user interfaces that may be utilized in relation to different embodiments of the present invention.

In one embodiment, breathing effort generator 200 may receive operator input (e.g., lung parameters, such as airway resistance, lung compliance, breath rate and patient effort, waveform selection, waveform specific parameters, etiology-specific breathing pattern template selection, etiology-specific parameters, desired effort trajectories) and provide feedback to an operator in the form of flow and/or pressure graphs, for example.

In accordance with the example depicted in FIG. 2, breathing effort generator 200 includes the following interacting functional units: a menu hierarchy 210, a waveform engine 220, a piecewise trajectory template 230, a sinusoidal empirical model 240 and etiologic templates 250. In one embodiment, responsive to operator input and information regarding desired breathing patterns, waveform characteristics and parameter values based on anatomical and/or physiological considerations and idiosyncrasies, etiology, disease status, breathing environment and patient state (e.g., position, exercise, metabolic rate, chemical stimuli, temperature, mechanical load, sleep state, behavioral status, etc.), the menu hierarchy 210 traverses an appropriate path through a hierarchical menu structure and prompts the operator for successively more detailed information until sufficient information has been acquired to commence the desired breathing simulation.

Waveform engine 220 receives information gathered via the user interface 260 by the menu hierarchy 210 and configures itself in accordance therewith. In one embodiment, general parameters for an experiment set-up include the following: (i) the total duration of the breathing experiment, (ii) the number of segments desired (e.g., 1 to N, where N depends on the waveform generation capabilities of the system, i.e., achievable resolution, etc.) and (iii) for each segment, the duration (e.g., 1 to M <milliseconds>, maximum and minimum values for M depend on system capabilities for timing, control, and resolution, etc.), breathing behavior (e.g., regular, irregular or apnea), the autopeep value and waveform model (e.g., sinusoidal model, etiologic template or configurable piecewise template). For example, in one embodiment, the operator of a test platform, such as test platform 100 may select from multiple waveform specifications, including a waveform specification supported by the sinusoidal empirical model 240, a waveform specification supported by the etiologic templates 250 and a waveform specification supported by the piecewise trajectory template 230. It is understood that an embodiment may allow a user to use the piecewise trajectory template to specify a closed form mathematical expression to be utilized for pattern generation.

According to one embodiment, the sinusoidal empirical model 240 is based upon an empirical model that approximates clinically-observed, patient-generated muscle pressures. An embodiment of a respiratory model based on the sinusoidal empirical model 240 will now be explained with reference to the simplified lumped-parameter analog model for a patient circuit and a single-compartment respiratory system depicted in FIG. 3. The model 300 includes a ventilator 305, resistance, $R_t$ 310, representing circuit tubing resistance, compliance, $C_t$ 335, representing circuit tubing compliance. In the context of this model 300, respiratory dynamics are captured by total respiratory resistance, $R_p$ 340, total respiratory compliance, $C_p$ 350, and patient-generated muscle pressure, $P_{mus}$ 355.

Figure 3:
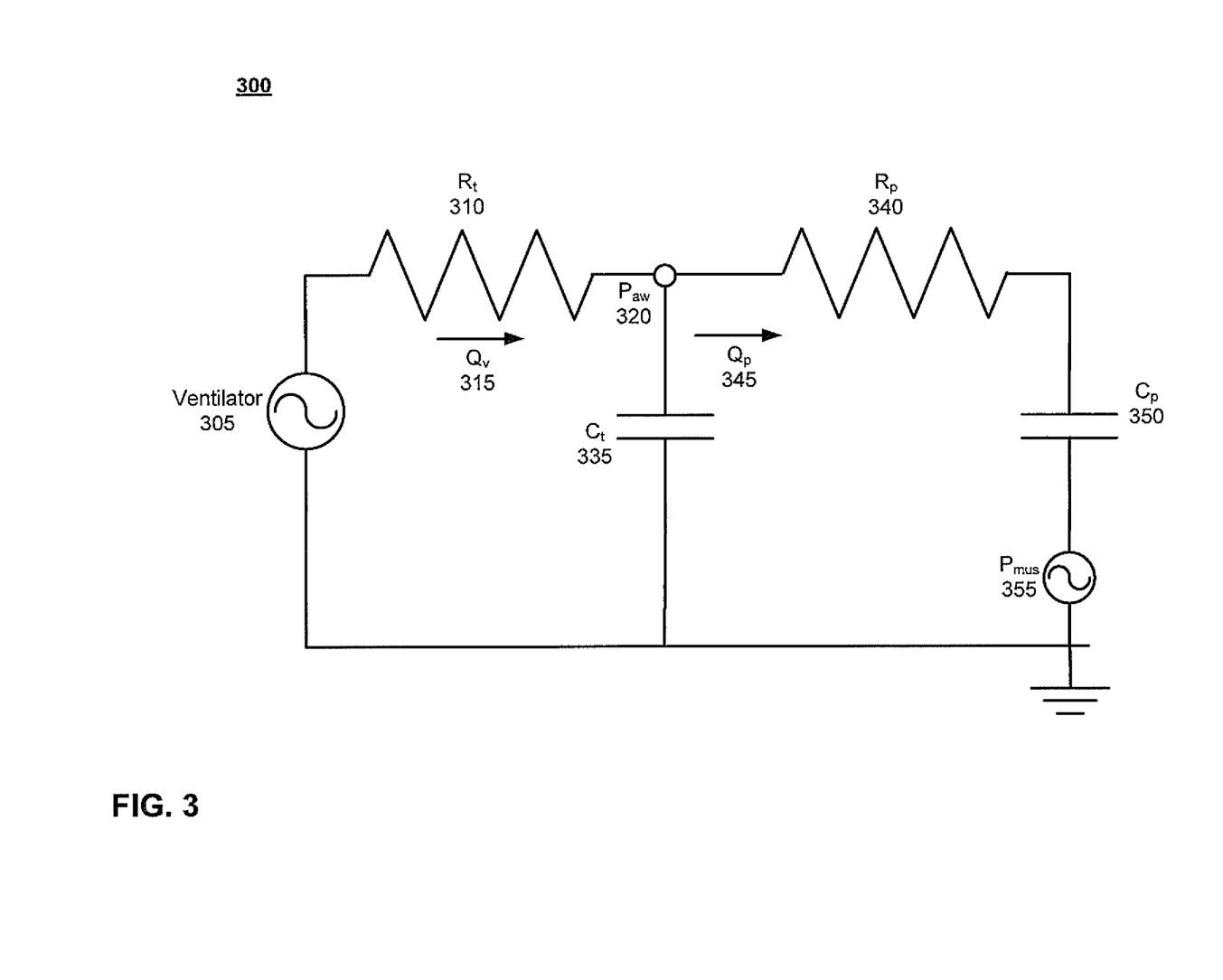
FIG. 3 represents a simplified lumped-parameter analog model for a patient circuit and a single-compartment respiratory system.

For practical purposes, the magnitude of the pressure generated by the respiratory muscles, $P_{mus}$ 355, is used as an index of breathing effort. Airway pressure, $P_{aw}$ 320, at the ventilator-patient interface may be calculated on an ongoing basis using patient parameters and $P_{mus}$ 355 according to the equation of motion:

$$P_{aw}(t) = E_p \int Q_p dt + Q_p R_p - P_{mus}(t) \qquad \text{EQ \#1}$$

where, $$Q_p = Q_{in} - Q_{out} + \text{phase} * Q_1 \qquad \text{EQ \#2}$$

$Q_p$ 245 is the instantaneous patient flow, and $E_p$ and $R_p$ are the patient's respiratory elastance and resistance, respectively. $Q_{in}$ represents the total flow delivered to the patient wye by the ventilator. $Q_{out}$ is the total flow estimated at the patient wye and exhausted through the exhalation limb. $Q_1$ is the instantaneous leak flow. Phase is −1 during inspiration and +1 during exhalation. Inspiratory muscle pressure is negative with a magnitude of $P_{mus}$ 255. Patient (lung) flow is assumed positive during inhalation and negative during exhalation.

Constructing an accurate model of the patient muscle pressure generator is challenging. Inspiratory muscle pressure, $P_{mus}$ 355, is a time-variant excitation function with inter- and intra-subject variations. In normal subjects, it is believed that $P_{mus}$ is in general dependent on breath rate, inspiration time and characteristic metrics of the inspiratory pressure waveform. However, in patients, other factors related to demanded and expendable muscle energy may critically influence muscle pressure generation. For example, for a given peak inspiratory pressure, the maximum sustainable muscle pressure may be affected by factors impairing muscle blood flow (blood pressure, vasomotor tone, muscle tension in the off-phase), the oxygen content of perfusing blood ($P_{o2}$, hemoglobin concentration), blood substrate concentration (glucose, free fatty acids), and the ability to extract sources of energy from the blood. Thus, respiratory motor output may vary significantly in response to variations in metabolic rate, chemical stimuli, temperature, mechanical load, sleep state and behavioral inputs. Moreover, there is a breath-by-breath variability in respiratory output that could lead to tidal volumes varying by a factor of four or more. The mechanism of this variability is not yet known.

According to various embodiments of the present invention, functions that approximate actual clinically-observed inspiratory and expiratory muscle pressures are used as part of a respiratory model by substituting them into the equation of motion (EQ #1) as appropriate. An example of a periodic function meeting these criteria for the inhalation phase is the following:

$$P_{mus_i}(t) = -P_{max}\left(1 - \frac{t}{t_v}\right)\sin\left(\frac{\pi t}{t_v}\right) \quad \text{EQ #3}$$

where,
$P_{max}$ represents a maximum inspiratory pressure,
$t_v$ represents duration of inspiration;
t represents an elapsed breath time varying between 0 and a total sum of inspiration and expiration periods; and
Muscle pressure, $P_{mus}$, represents the magnitude of $P_{mus}$.

Based on the disclosure provided herein, one of ordinary skill in the art will recognize a variety of alternative periodic and semi-periodic functions that may be used in relation to different embodiments of the present invention. For example, in EQ #3, above, $P_{max}$ may be assumed to be a constant or a time-varying parameter, thus resulting in a function having a constant amplitude or a time-varying amplitude.

A similar model may be used for the exhalation phase as well. An example of a periodic function meeting the criteria of approximating actual clinically-observed expiratory muscle pressures is the following:

$$P_{mus_e}(t) = P_{max}\left(\frac{t}{t_v}\right)\sin\left(\frac{\pi(t - t_v)}{t_{tot} - t_v}\right) \quad \text{EQ #4}$$

where,
$P_{max}$ represents a maximum expiratory pressure,
$t_v$ represents duration of expiration;
$t_{tot}$ represents a total sum of inspiration and expiration periods;
t represents an elapsed breath time varying between 0 and $t_{tot}$; and
Muscle pressure, $P_{mus}$ represents the magnitude of $P_{mus}$.

Based on the disclosure provided herein, one of ordinary skill in the art will recognize a variety of alternative periodic and semi-periodic functions that may be used in relation to different embodiments of the present invention. For example, in EQ #4, above, $P_{max}$ may be assumed to be a constant or a time-varying parameter, thus resulting in a function having a constant amplitude or a time-varying amplitude.

In alternative embodiments, inspiratory and expiratory resistances used in the respiratory model may be assumed to be equal.

While, as discussed above, under real conditions, $P_{max}$, and $t_v$ are known to demonstrate time-variance, for purposes of various embodiments of the present invention, $P_{max}$ is assumed to be constant for fixed steady state conditions of physiologic and interactive parameters affecting muscle pressure generation. During inspiration, the magnitude of $R_p$ and $C_p$ change dynamically as the lung is inflated. However, amplitude and duration multipliers may be specified and used to simulate naturally-occurring variations in human breathing pattern. These multipliers may be used to further fine tune the magnitude and timing of the respiratory effort.

Taking the Laplace transform of $P_{mus}$ during inspiration to produce a more readily and computationally efficiently solvable algebraic equation yields the following:

$$P_{mus}(s) = (\pi)\frac{\frac{P_{max}}{t_v}\left(s - \frac{\pi}{t_v}\right)^2}{\left[s^2 + \left(\frac{\pi}{t_v}\right)^2\right]^2} \quad \text{EQ #5}$$

A similar function may be derived for the exhalation phase using EQ #4, above.

In accordance with various embodiments of the present invention, the respiratory model, e.g., sinusoidal empirical model 240, may be formed by combining the inhalation and exhalation models above with the equation of motion in terms of patient and ventilator/accessories parameters. The respiratory model thus formed may then be used to extract any unspecified model parameters 270 and to generate the respiratory muscle effort waveform 280.

According to one embodiment, generation of the respiratory muscle effort waveform 280 involves continuous and breath-by-breath evaluation, measurement and closed-loop feedback control of the actuators, and adaptive parameter optimization of the simulation parameters to ensure proper execution and tracking of the desired muscle pressure trajectories. In one embodiment, if the operator selects the sinusoidal empirical model 240 as the waveform specification for use during any segment of the breathing experiment, the operator is prompted for the following additional parameters to facilitate generation of the respiratory muscle effort waveform 280: (i) the maximum inspiratory effort amplitude ($P_{max}$, inspiration), (ii) the amplitude multiplier for inspiration, (iii) the inspiration time, (iv) the exhalation time or rate, (v) the maximum expiratory effort amplitude ($P_{max}$, expiration) and (vi) the amplitude multiplier for expiration.

Returning to FIG. 2, etiologic templates 250 may be provided in the form of partially or fully configurable etiology-driven templates. According to literature, certain respiratory diseases may be characterized by quantifiable patterns with constant or time-variant waveform properties. Three examples of such descriptions include Kussmaul, Biots', and Cheyne-Stokes breathing behavior Kussmaul breathing is characterized by deep, regular breathing due to metabolic acidosis (diabetic acidosis and coma), and the rate may be fast, normal or slow. Biots' breathing is characterized by several short breaths followed by long irregular periods of apnea. It is seen in increased intracranial pressure. Cheyne-Stokes respiration is characterized by periods of apnea of 10 to 20 seconds separated by approximately equal periods of hyperventilation. Similar descriptions for other etiologies can be extracted from literature, knowledge databases and the like. In one embodiment, generalized templates for each case can be developed to incorporate the main characteristics reported.

In alternative embodiments, sample real world patient data, such as model parameter values and respiratory muscle effort values, may be collected from a patient exhibiting a desired breathing behavior to be reproduced in the test platform environment. Subsequently, the collected data may be played back in modified or unmodified form. Similarly, the breathing effort generator 200 may output model parameter values and respiratory muscle effort values in accordance with a spreadsheet, script file, LabVIEW code or the like.

In embodiments using configurable etiology-driven templates, after selection of an etiology-specific breathing pattern template by the operator, the menu hierarchy 210 may present case-specific template menus to the operator via the user interface 260 to obtain desired values for various further etiology-specific parameters, such as temporal, magnitude, time multipliers (regular, irregular), magnitude multipliers (regular, irregular), apnea periods and the like.

The piecewise trajectory template 230 provides a waveform specification option with the most flexibility in various respects by allowing the operator with the capability to define desired inspiratory and expiratory effort trajectories of choice. In one embodiment, the trajectories are received in the form of piecewise effort coordinates for settable time differentials, thereby allowing the operator to achieve desired resolution. According to some embodiments, a spline interpolation (or similar) algorithm is used to smooth out slope transitions between consecutive intervals in an effort to prevent discontinuities. For example, a linear, cubic or quadratic spline interpolation may be applied to the operator-defined coordinates.

According to one embodiment and as discussed further below, if the operator selects the piecewise trajectory template 230 as the waveform specification for use during any segment of the breathing experiment, the operator is prompted for the following additional parameters: (i) for both inhalation and exhalation intervals, the number of points or duration of equal subdivision in a segment for which the operator will specify an effort coordinate, (ii) for each time coordinate for which an effort coordinate is to be operator specified, the effort magnitudes (or interval slope) for the time coordinate, (iii) the inspiration time, (iv) the exhalation time or rate, (v) the amplitude multiplier for inspiration and (vi) the amplitude multiplier for expiration.

In some embodiments, the functionality of one or more of the above-referenced functional units may be merged in various combinations. For example, waveform engine 220 and piecewise trajectory template 230, sinusoidal empirical model 240 and/or etiologic templates 250 may be combined. Similarly, the functionality of one or more of the above-referenced functional units may be distributed across additional functional units. For example, menu hierarchy 210 may be divided into multiple functional units representative of individual menu hierarchies for each waveform specification option. Moreover, the various functional units can be communicatively coupled using any suitable communication method (e.g., message passing, parameter passing, and/or signals through one or more communication paths, etc.). Additionally, the functional units can be physically connected according to any suitable interconnection architecture (e.g., fully connected, hypercube, etc.).

According to embodiments of the invention, the functional units can be any suitable type of logic (e.g., digital logic, software code, scripts, templates and the like) for executing the operations described herein. Any of the functional units used in conjunction with embodiments of the invention can include machine-readable media including instructions for performing operations described herein. Machine-readable media include any mechanism that provides (i.e., stores and/or transmits) information in a form readable by a machine (e.g., a computer). For example, a machine-readable medium includes, but is not limited to, read only memory (ROM), random access memory (RAM), magnetic disk storage media, optical storage media or flash memory devices.

Figure 4:
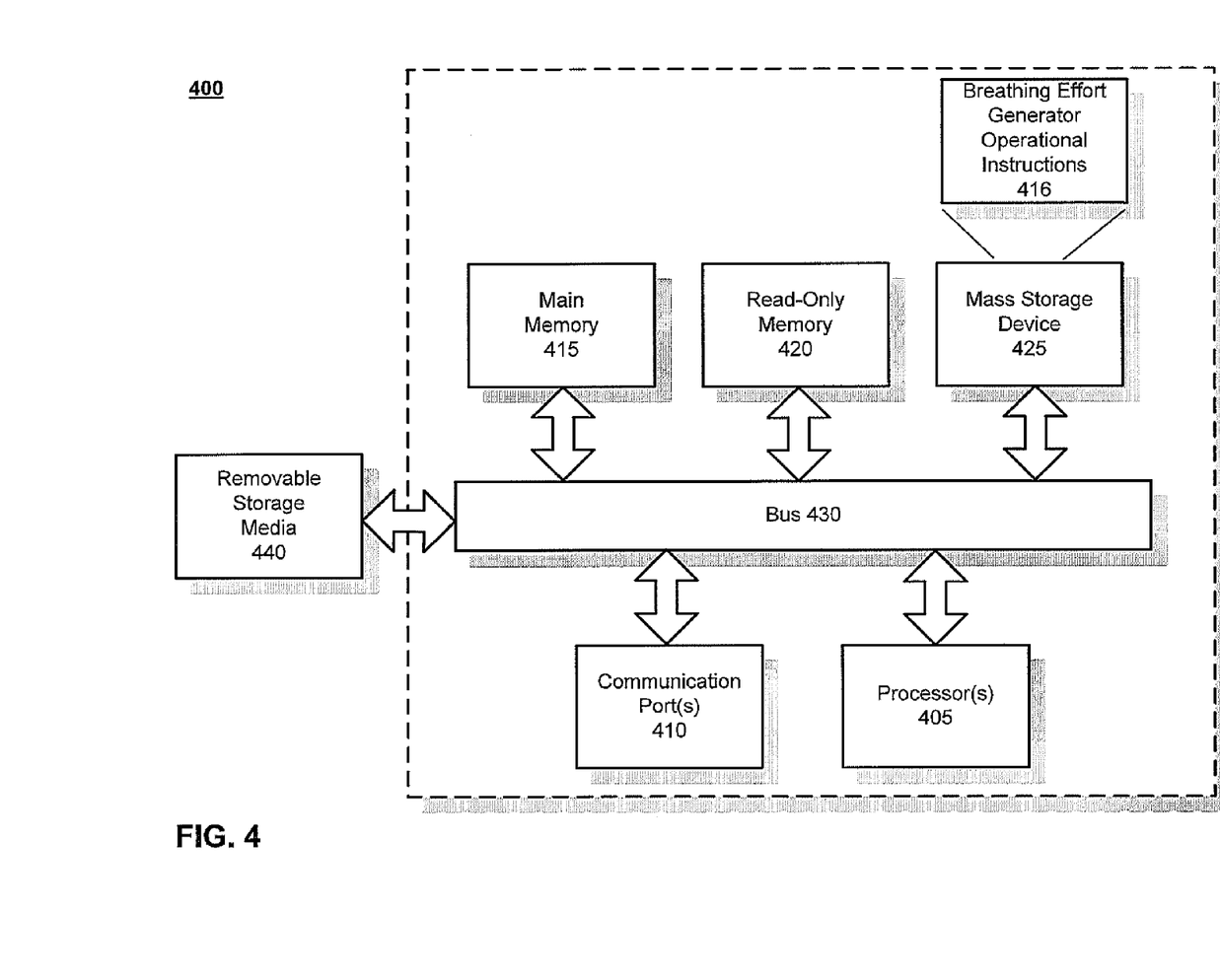
FIG. 4 is an example of a computer system with which embodiments of the present invention may be utilized.

FIG. 4 is an example of a computer system 400, such as a workstation, personal computer, laptop computer, pocket computer, PDA, client, server or the like, with which embodiments of the present invention may be utilized.

According to the present example, the computer system includes a bus 430, one or more processors 405, at least one communication port 410, a main memory 415, a removable storage media 440, a read only memory 420, and a mass storage device 425.

Processor(s) 405 can be any known processor, such as, but not limited to, an Intel® Itanium® or Itanium 2 processor(s), or AMD® Opteron® or Athlon MP® processor(s), or Motorola® lines of processors. Communication port(s) 410 can be any of an RS-232 port for use with a modem based dialup connection, a serial port (e.g., an IEEE 1394 interface, a Universal Serial Bus (USB) interface), a parallel port, a 10/100 Ethernet port, or a Gigabit port using copper or fiber. Communication port(s) 410 may be chosen depending on, among other factors, (i) the types of physical interconnections that are expected to be made with computer system 400 and (ii) the type of network, such a Local Area Network (LAN), Wide Area Network (WAN), or other network environment to which the computer system 400 connects.

Main memory 415 can be Random Access Memory (RAM), or any other dynamic storage device(s) commonly known in the art. During operation, main memory 415 has stored therein all or a portion of breathing effort generator operational instructions 416, which implement the functional units of FIG. 2, for example, when executed by processor(s) 405. Operational instructions 416 may be software instructions, firmware instructions or some combination thereof. Operational instructions 416 are executable by processor(s) 405, and may be used to cause processor(s) 405 to generate and deliver appropriate control signals 111 based on operator waveform specification selections, waveform parameters, etc. to lung simulation system 120, which responsive thereto may then cause a desired breathing pattern to be simulated.

Read only memory 420 can be any static storage device(s) such as Programmable Read Only Memory (PROM) chips for storing static information such as start-up or BIOS instructions for processor(s) 405.

Mass storage 425 can be used to store information and instructions, e.g., breathing effort generator operational instructions 416. For example, hard disks such as the Adaptec® family of SCSI drives, an optical disc, an array of disks such as RAID, such as the Adaptec family of RAID drives, or any other mass storage devices may be used.

Bus 430 communicatively couples processor(s) 405 with the other memory, storage and communication blocks. Bus 430 can be a PCI/PCI-X or SCSI based system bus depending on the storage devices used.

Operator and administrative interfaces (not shown), such as a display, keyboard, and a cursor control device, may also be coupled to bus 430 to support direct operator interaction with computer system 400. Other operator and administrative interfaces can be provided through network connections connected through communication ports 410.

Removable storage media 440 can be any kind of external hard-drives, floppy drives, IOMEGA® Zip Drives, Compact Disc—Read Only Memory (CD-ROM), Compact Disc—Re-Writable (CD-RW), Digital Video Disk—Read Only Memory (DVD-ROM).

Figure 5:
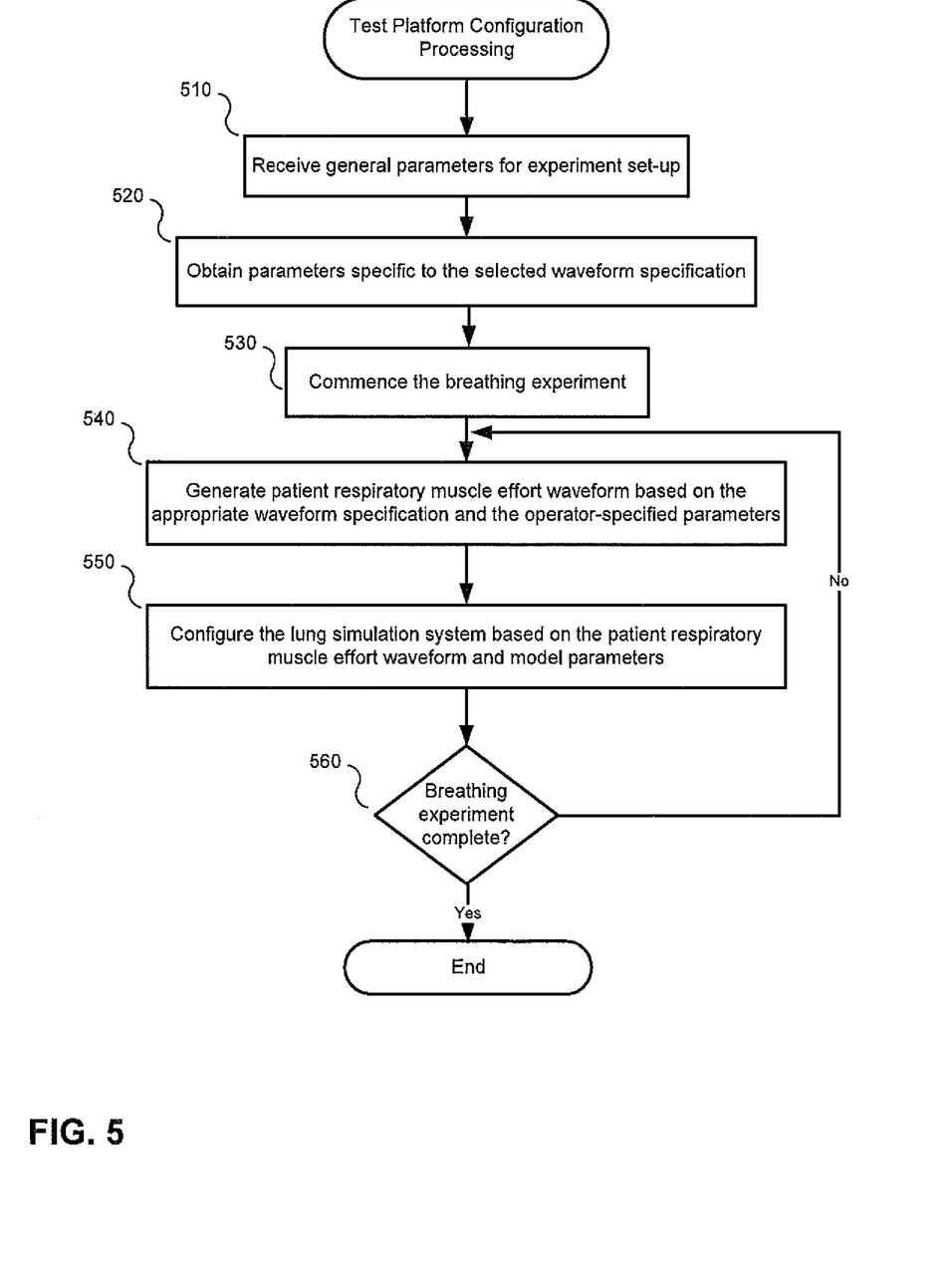
FIG. 5 is a high-level flow diagram illustrating test platform configuration processing in accordance with an embodiment of the present invention.

FIG. 5 is a high-level flow diagram illustrating test platform configuration processing in accordance with an embodiment of the present invention. At block 510, general parameters for breathing experiment set-up are received. According to one embodiment, menu hierarchy 210 prompts an operator via the user interface 260 to enter (i) the total duration of the breathing experiment, (ii) the number of segments desired (e.g., 1 to N, N depends on the waveform generation capabilities of the system, i.e., achievable resolution, etc.) and (iii)

for each segment, the duration (e.g., 1 to M <milliseconds>, >, maximum and minimum values for M depend on system capabilities for timing, control, and resolution, etc.), breathing behavior (e.g., regular, irregular or apnea), the autopeep value and waveform model (e.g., sinusoidal model, etiologic template or configurable piecewise template).

At block 520, having received the general parameters, parameters specific to the selected waveform specification are obtained. In one embodiment, responsive to operator selection of the sinusoidal empirical model 240 as the waveform specification for use during any segment of the breathing experiment, the operator is prompted for the following additional parameters specific to the sinusoidal empirical model 240 for the segment of the breathing experiment at issue: (i) the maximum inspiratory effort amplitude ($P_{max}$, inspiration), (ii) the amplitude multiplier for inspiration, (iii) the inspiration time, (iv) the exhalation time or rate, (v) the maximum expiratory effort amplitude ($P_{max}$, expiration) and (vi) the amplitude multiplier for expiration.

According to one embodiment, responsive to operator selection of the etiologic templates 250 as the waveform specification for use during any segment of the breathing experiment, the operator is presented with case-specific template menus to obtain desired values for various further waveform parameters for the segment of the breathing experiment at issue.

In one embodiment, responsive to operator selection of the piecewise trajectory template 230 as the waveform specification for use during any segment of the breathing experiment, the operator is presented with menus allowing the operator to define desired inspiratory and expiratory effort trajectories of choice for the segment of the breathing experiment at issue.

At block 530, assuming all segments of the breathing experiment have been configured as desired, the breathing experiment is commenced.

At block 540, the respiratory muscle effort waveform 280 is generated based on the appropriate waveform specification and the operator-specified parameters on a segment-by-segment basis as will be described in further detail with reference to FIG. 6.

At block 550, the lung simulation system is configured based on the respiratory muscle effort waveform 280 and model parameters 270. In accordance with various embodiments of the present invention, one or more model parameters 270 may be changed on the fly interactively by the operator or other automated means to simulate the dynamically changing nature of the magnitude of $R_p$ and $C_p$ as the lung is inflated, for example.

At decision block 560, it is determined if the breathing experiment is complete. If so, then test platform configuration processing terminates and a new experiment may be set-up or the current experiment may be run again. Otherwise, processing branches back to block 540 at which point the patient respiratory muscle effort waveform for the next segment of the breathing experiment is generated based on the waveform specification and the particular waveform specification parameters associated with the next segment of the breathing experiment.

Figure 6:
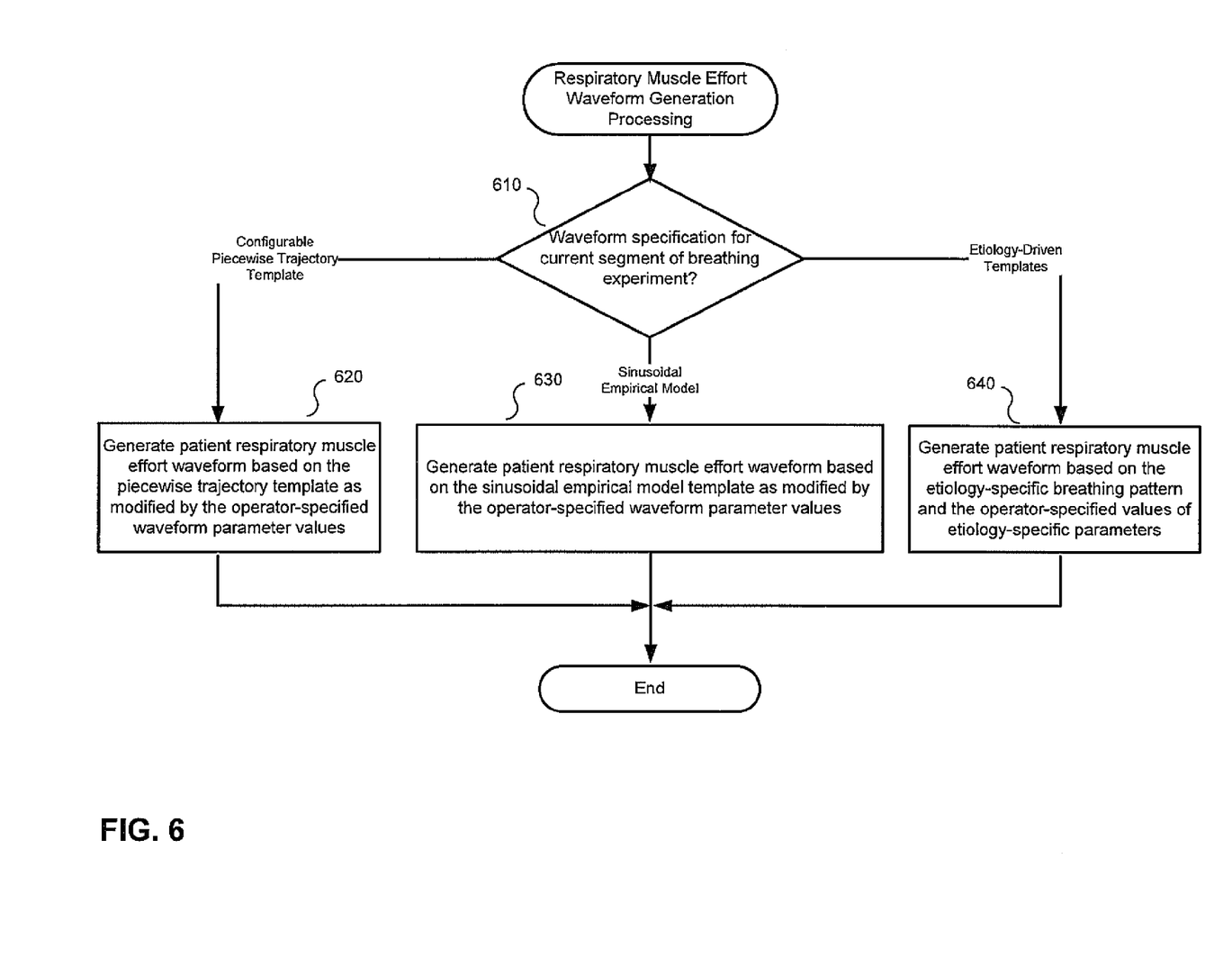
FIG. 6 is a high-level flow diagram illustrating respiratory muscle effort waveform generation processing in accordance with an embodiment of the present invention.

FIG. 6 is a high-level flow diagram illustrating respiratory muscle effort waveform generation processing in accordance with an embodiment of the present invention. This flow diagram represents one of various approaches for implementing the processing that may be performed in block 540 of FIG. 5.

At decision block 610, a determination is made regarding the operator-selected waveform specification for the current segment of the breathing experiment. If the selected waveform specification for the segment at issue is the configurable piecewise trajectory template, then processing continues with block 620. If the selected waveform specification for the segment at issue is the sinusoidal empirical model, then processing continues with block 630. Otherwise if the selected waveform specification for the current segment is the etiology-driven templates, then processing continues with block 640.

At block 620, it has been determined that the waveform specification to be used for the current segment of the breathing experiment is the configurable piecewise trajectory template. Therefore, the patient respiratory muscle effort waveform is generated based on the piecewise trajectory template as modified by the operator-specified waveform parameter values.

At block 630, it has been determined that the waveform specification to be used for the current segment of the breathing experiment is the sinusoidal empirical model. Therefore, the patient respiratory muscle effort waveform is generated based on the sinusoidal empirical model template as modified by the operator-specified waveform parameter values. In one embodiment, this involves setting up a desired lung configuration (e.g., resistance, compliance), setting up the test ventilator, generating a desired respiratory muscle effort waveform by using the sinusoidal model and its assigned parameters, regulating the muscle pressure actuators and their closed-loop feedback controllers to ensure acceptable tracking of the desired muscle pressure trajectory, and monitoring the lung flow and pressure waveforms and the performance of the test ventilator.

At block 640, it has been determined that the waveform specification to be used for the current segment of the breathing experiment is the etiology-driven templates. Therefore, the patient respiratory muscle effort waveform is generated based on the etiology-specific breathing pattern and the operator-specified values of etiology-specific parameters.

In various embodiments, the operator may be prompted for and provide values for patient size, breathing rate, rhythm, volume, flow, pressure, pattern, shape, compliance, airway resistance and other key variables to generate a customized patient profile.

The test platform may also be loaded with pre-programmed pathophysiologic profiles reflecting what a ventilator would encounter in common acute disease states. According to one embodiment, each profile reflects a specific, reproducible ventilatory pattern (incorporating values for all applicable of the above-noted variables/parameters). Examples of potential pre-programmed profiles, broken out into exemplary categories are outlined below. Various other pre-programmed profiles will be apparent to those skilled in the art. In one embodiment, only patient size and/or age are configurable for the pre-programmed profiles.

I. Normal Spontaneous Tidal Ventilation

II. Ventilatory Drive Abnormalities a. Central ventilatory depression: drug or metabolically induced    b. Central ventilatory stimulation: respiratory/metabolic academia/hypoxemia, sympathetic overflow, anxiety    c. Abnormalities of closed loop feedback       i. Low cardiac output states       ii. Increased intracranial pressure/tentorial herniation       iii. Cheyne Stokes       iv. Kussmaul       v. Biots III. Increased Airway Resistance
  a. Upper airway: pharyngeal obstruction, laryngeal obstruction, mediastinal level obstruction, tracheomalacia, positive vs. negative pressure modeling of resistance.
  b. Lower airway/small airway obstruction—asthma/pulmonary edema
  c. Inspiratory vs. expiratory resistance model—gas trapping, auto peep, physiologic ball-valving
  d. Regional airway occlusion
  e. Circuit/endotracheal and tracheostomy tube/trach resistance IV. Compliance/Elastance Problems
  a. Decreased thoracic compliance: restrictive disorders, increased intra-abdominal pressure
  b. Decreased lung compliance: increased lung water, consolidation, over-inflation
  c. Decreased regional lung compliance (space occupying lesions, pneumothorax, etc.)
  d. Increased thoracic/lung compliance: Chronic Obstructive Pulmonary Disease (COPD)
  e. Negative vs. positive pressure modeling of compliance V. Neuromuscular Abnormalities
  a. Neuromuscular paralysis
  b. Gradations of neuromuscular weakness
  c. Inspiratory muscular fatigue/dyscoordination
  d. Expiratory muscular dyscoordination
  e. Flail chest
  f. Hemidiaphragmatic paresis In an embodiment in which age and/or patient size are configurable parameters, values for these parameters may be received for the selected pre-programmed patient profile, which may then be used to either fix a range of allowable values for the key variables associated with the selected pre-programmed patient profile that would allow customization of the profile, or an applicable range can then be set for some or all variables to allow a degree of fine tuning by the operator.

As indicated above, given the wide range of values for the various physiologic indices, one implementation may incorporate a full capability range so one device would model any and all patient situations. Alternatively, multiple settings may be provided by the test platform so it can function in accordance with an operator-selected mode (e.g., adult, pediatric or neonatal), Another alternative, especially in light of challenges posed by using the same hardware for different patient types, would be to devise separate devices for modeling adults, pediatrics and neonates.

In conclusion, the invention provides novel systems, methods and devices for configuring a lung simulation system. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A non-transitory machine-readable medium comprising instructions that, when executed by a processing unit of an electronic computing system, cause the processing unit to perform a method comprising:
  providing a plurality of respiratory muscle effort waveform specifications for use by a breathing effort generator of a test platform, each of the plurality of respiratory muscle effort waveform specifications having associated therewith one or more waveform parameters, the plurality of respiratory muscle effort waveform specifications including each of (i) a first waveform specification based upon an empirical model that approximates clinically-observed, patient-generated muscle pressures, (ii) a second waveform specification based on configurable etiology-driven templates and (iii) a third waveform specification based on configurable piecewise trajectory templates;
  wherein each configurable etiology-driven template comprises a generalized, case-specific template representing quantifiable patterns of breathing behavior associated with a respiratory disease; and wherein each configurable piecewise trajectory template comprises piecewise effort coordinates for configurable time differentials;
  configuring a waveform engine of the breathing effort generator in accordance with (i) a selected waveform specification of the plurality of respiratory muscle effort waveform specifications and (ii) values for each of the one or more waveform parameters of the selected waveform specification; and
  causing a desired breathing pattern to be simulated by a lung simulation system of the test platform based on (1) one or more model parameter values and (ii) a respiratory muscle effort waveform generated by the waveform engine.

2. The method of claim 1, further comprising prompting an operator of the test platform to provide desired values for each of the one or more waveform parameters utilizing case-specific template menus.

3. The method of claim 1, further comprising receiving information regarding one or more of patient size, ventilatory rate, rhythm, volume, flow, pressure, pattern, shape, compliance, airway resistance and other variables to generate a customized patient profile.

4. The method of claim 1, further comprising providing a plurality of pre-programmed pathophysiologic profiles reflecting specific reproducible ventilatory patterns associated with common acute disease states.

5. The method of claim 1, further comprising providing a plurality of pre-programmed patient profiles reflecting specific reproducible ventilatory patterns associated with patients in one or more categories including (i) normal spontaneous tidal ventilation, (ii) ventilatory drive abnormalities, (iii) increased airway resistance, (iv) compliance/elastance problems and (v) neuromuscular abnormalities.

6. The method of claim 1, wherein the empirical model includes one or more periodic or semi-periodic functions.

7. The method of claim 6, wherein the one or more periodic or semi-periodic functions include a periodic function for an inspiratory phase of respiration that approximates clinically-observed, inspiratory muscle pressures.

8. The method of claim 7, wherein the periodic function for the inspiratory phase of respiration is generally expressed as:

$$P_{mus_i}(t) = -P_{\max}\left(1 - \frac{t}{t_v}\right)\sin\left(\frac{\pi t}{t_v}\right)$$

where,
$P_{max}$ represents a maximum inspiratory pressure, which may be a constant or a time-varying parameter;
$t_v$ represents duration of inspiration; and
$t$ represents an elapsed breath time varying between 0 and a total sum of inspiration and expiration periods.

9. The method of claim 8, further comprising receiving information from an operator of the test platform indicative of the maximum inspiratory pressure, an amplitude multiplier for the inspiratory phase and the duration of inspiration.

10. The method of claim 6, wherein the one or more periodic or semi-periodic functions include a periodic function for an expiratory phase of respiration that approximates clinically-observed, expiratory muscle pressures.

11. The method of claim 10, wherein the periodic function for the expiratory phase of respiration is generally expressed as:

$$P_{mus_e}(t) = P_{max}\left(\frac{t}{t_v}\right)\sin\left(\frac{\pi(t-t_v)}{t_{tot}-t_v}\right)$$

where, $P_{max}$ represents a maximum expiratory pressure, which may be a constant or a time-varying parameter;

$t_v$ represents duration of expiration;

$t_{tot}$ represents a total sum of inspiration and expiration periods; and t represents an elapsed breath time varying between 0 and $t_{tot}$.

12. The method of claim 11, further comprising receiving information from an operator of the test platform indicative of the maximum expiratory pressure, an amplitude multiplier for the expiratory phase and the duration of expiration.

13. The method of claim 1, wherein when the selected waveform specification comprises the third waveform specification, the method further comprises receiving information from an operator of the test platform indicative of desired inspiratory and expiratory effort trajectories.

14. The method of claim 13, wherein the method further comprises smoothing out slope transitions between consecutive intervals defined by the piecewise effort coordinates.

15. A breathing effort generator comprising:
a storage device having stored therein one or more routines for causing a desired breathing pattern to be simulated by a lung simulation system; and
one or more processors operable to execute the one or more routines to generate a respiratory muscle effort waveform in accordance with a selected waveform specification of a plurality of respiratory muscle effort waveform specifications, the plurality of respiratory muscle effort waveform specifications include each of (i) a first waveform specification based upon an empirical model that approximates clinically-observed, patient-generated muscle pressures, (ii) a second waveform specification based on configurable etiology-driven templates and (iii) a third waveform specification based on configurable piecewise trajectory templates;
wherein each configurable etiology-driven template comprises a generalized, case-specific template representing quantifiable patterns of breathing behavior associated with a respiratory disease; and wherein each configurable piecewise trajectory template comprises piecewise effort coordinates for configurable time differentials.

16. The breathing effort generator of claim 15, further comprising prompting an operator of the test platform to provide desired values for one or more waveform parameters utilizing case-specific template menus.

17. The breathing effort generator of claim 15, wherein the selected waveform specification comprises the first waveform specification and the empirical model comprises a sinusoidal function for an inspiratory phase of respiration that approximates clinically-observed, inspiratory muscle pressures generally expressed as:

$$P_{mus_i}(t) = -P_{max}\left(1-\frac{t}{t_v}\right)\sin\left(\frac{\pi t}{t_v}\right)$$

where, $P_{max}$ represents a maximum inspiratory pressure, which may be a constant or a time-varying parameter;

$t_v$ represents duration of inspiration; and t represents an elapsed breath time varying between 0 and a total sum of inspiration and expiration periods.

18. The breathing effort generator of claim 17, wherein the empirical model further comprises a sinusoidal function for an expiratory phase of respiration that approximates clinically-observed, expiratory muscle pressures generally expressed as:

$$P_{mus_e}(t) = P_{max}\left(\frac{t}{t_v}\right)\sin\left(\frac{\pi(t-t_v)}{t_{tot}-t_v}\right)$$

where, $P_{max}$ represents a maximum expiratory pressure, which may be a constant or a time-varying parameter;

$T_v$ represents duration of expiration;

$t_{tot}$ represents a total sum of inspiration and expiration periods; and t represents an elapsed breath time varying between 0 and $t_{tot}$.

19. The breathing effort generator of claim 15, wherein when the selected waveform specification comprises the third waveform specification, information is received from an operator of the breathing effort generator indicative of desired inspiratory and expiratory effort trajectories.

20. The method of claim 1, wherein the non-transitory machine-readable medium comprises at least one of: floppy diskettes, optical disks, compact disc read-only memories, magneto-optical disks, read-only memories, random access memories, erasable programmable read-only memories, electrically erasable programmable read-only memories, magnetic cards, optical cards, flash memory, MultiMedia Cards, and secure digital cards.

* * * * *